US012672595B1

(12) United States Patent
Boetsch

(10) Patent No.: US 12,672,595 B1
(45) Date of Patent: Jul. 7, 2026

(54) DEPTH REGULATION DEVICE FOR A SEEDING MACHINE

(71) Applicant: BPB Mediterranea S.A., Villa Maria (AR)

(72) Inventor: Gustavo Alejandro Boetsch, Villa Maria (AR)

(73) Assignee: BPB MEDITERRANEA S.A., Villa Maria (AR)

( * ) Notice: Subject to any disclaimer, the term of this patent is extended or adjusted under 35 U.S.C. 154(b) by 0 days.

(21) Appl. No.: 19/256,081

(22) Filed: Jun. 30, 2025

(30) Foreign Application Priority Data

Feb. 18, 2025 (AR) .............................. P20250100450

(51) Int. Cl.
  A01B 63/11 (2006.01)
  A01B 63/111 (2006.01)
  A01B 63/114 (2006.01)
(52) U.S. Cl.
  CPC ......... A01B 63/1115 (2013.01); A01B 63/114 (2013.01)
(58) Field of Classification Search
  CPC .... A01B 63/1115; A01B 63/114; A01C 7/203
  See application file for complete search history.

(56) References Cited

U.S. PATENT DOCUMENTS

| | | | | | |
|---|---|---|---|---|---|
| 4,858,475 | A * | 8/1989 | Jacobson | .............. | G01L 1/2225 |
| | | | | | 73/862.642 |
| 6,769,315 | B2 * | 8/2004 | Stevenson | .......... | G01G 23/3728 |
| | | | | | 73/794 |
| 7,747,396 | B2 * | 6/2010 | El-Bakry | .......... | G01G 23/3735 |
| | | | | | 702/42 |
| 8,024,980 | B2 * | 9/2011 | Arms | .................... | G01L 5/1627 |
| | | | | | 73/761 |
| 8,561,472 | B2 * | 10/2013 | Sauder | .................... | G01L 5/136 |
| | | | | | 73/760 |
| 8,933,713 | B2 * | 1/2015 | Eriksen | ................. | B64C 25/001 |
| | | | | | 324/686 |
| 9,338,937 | B2 * | 5/2016 | Sauder | .................... | A01C 5/064 |
| 9,750,174 | B2 * | 9/2017 | Sauder | ................. | A01B 79/005 |
| 11,134,606 | B2 * | 10/2021 | Salowitz | ................ | A01C 7/082 |
| 11,925,137 | B2 * | 3/2024 | Salowitz | ................ | A01C 5/064 |
| 12,022,754 | B2 * | 7/2024 | Rhodes | .................. | A01C 7/107 |
| 2010/0180695 | A1 * | 7/2010 | Sauder | ................. | A01B 63/008 |
| | | | | | 73/862.045 |
| 2012/0255475 | A1 * | 10/2012 | Mariman | ............... | A01C 5/066 |
| | | | | | 111/149 |
| 2014/0034339 | A1 * | 2/2014 | Sauder | ................. | G01L 5/0038 |
| | | | | | 172/664 |

(Continued)

FOREIGN PATENT DOCUMENTS

EP          3429911 B1 *  2/2022   ............. B62D 55/32

*Primary Examiner* — Jamie L McGowan
(74) *Attorney, Agent, or Firm* — The Morales Law Firm; Joseph L. Morales, Esq.

(57) ABSTRACT

A sensor associated to a depth regulation device, applicable to a sowing body, wherein said sensor is mechanically coupled to the aforementioned depth regulation device, comprising at least one load application point arranged on its upper surface and in proximity to the lower section of a transverse shaft which receives and transmits the load applied by a respective pivot connected to the support arms of a respective gauge wheel of the seeding unit.

14 Claims, 7 Drawing Sheets

(56)     References Cited

U.S. PATENT DOCUMENTS

| | | | |
|---|---|---|---|
| 2014/0116735 A1* | 5/2014 | Bassett | A01C 7/203 |
| | | | 172/430 |
| 2016/0165789 A1* | 6/2016 | Gervais | A01C 7/205 |
| | | | 700/275 |
| 2017/0261450 A1* | 9/2017 | Baarman | G01N 25/72 |
| 2018/0340845 A1* | 11/2018 | Rhodes | A01C 5/064 |
| 2019/0000004 A1* | 1/2019 | Sloneker | A01C 7/203 |
| 2019/0254222 A1* | 8/2019 | Rhodes | A01C 7/107 |
| 2020/0281112 A1* | 9/2020 | Salowitz | A01C 5/064 |
| 2021/0059095 A1* | 3/2021 | Sloneker | A01B 63/12 |
| 2021/0185891 A1* | 6/2021 | Bergerfurth | A01C 5/064 |
| 2022/0361391 A1* | 11/2022 | Sloneker | A01C 7/203 |
| 2022/0373317 A1* | 11/2022 | Swanson | G01B 7/26 |
| 2023/0110072 A1* | 4/2023 | Herrmann | A01C 7/203 |
| 2023/0337569 A1* | 10/2023 | Stanhope | A01C 5/064 |
| 2024/0000005 A1* | 1/2024 | Stanhope | A01C 5/064 |
| 2024/0040958 A1* | 2/2024 | Litwiller | A01C 7/205 |
| 2024/0365702 A1* | 11/2024 | Frank | A01C 21/00 |
| 2025/0241233 A1* | 7/2025 | Gentili | A01C 5/064 |

* cited by examiner

FIG. 4 – Prior Art

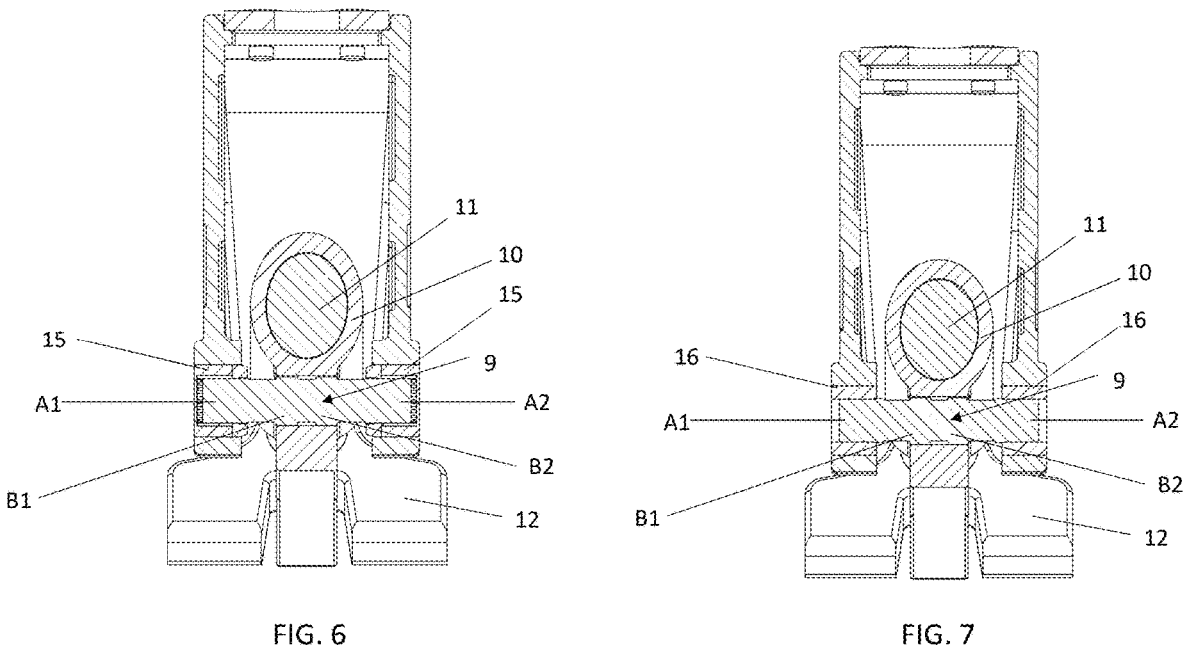
FIG. 6                                    FIG. 7

8

9

10

11

12

14

17

DEPTH REGULATION DEVICE FOR A SEEDING MACHINE

FIELD OF THE INVENTION

The present invention relates to subassemblies of sowing bodies, suitable for regulating and controlling the penetration depth of the sowing body of an agricultural seeding and/or planting machine into the soil.

More specifically, the present invention relates to a depth regulation device for at least one seeding body of an agricultural machine, which incorporates a sensor capable of measuring the reactive force exerted by the soil against the seeding body during the furrow generation stage in a sowing process, in order to control the magnitude of the force applied to the seeding body and act in real time to maintain a furrow with the correct geometry and depth to deposit the seeds and subsequently cover the furrow, fundamentally avoiding excessive soil compaction and/or very shallow sowing.

PRIOR ART

In modern agriculture, precision seeding systems have gained importance due to the need to maximize crop yield and optimize resource use. One of the key components in these systems is the seeding unit (also known as the seeding unit, seeding line, seeding train, among other forms), which is responsible for creating a furrow in the soil, placing the seeds at the bottom of the furrow evenly and precisely, and finally closing the furrow.

The main functions of the sowing process are summarized in the following steps: the generation of a furrow with a certain geometry, avoiding soil compaction and achieving an ideal depth; the deposit of seeds with uniform spacing and singularity and, finally, the correct covering of said furrow.

As well known, the hardness and properties of the soil require determining an appropriate planting depth to achieve ideal crop growth.

To achieve this, certain mechanisms must be activated in the seeding bodies to achieve these seeding depths. Generally, these mechanisms consist of a travel stop or depth adjustment device, which stops the upward movement of the leveling wheel arms.

These depth adjustment devices rotate around a pivot to change the height of the travel stop. The sensor is placed on this pivot.

To ensure optimal seed placement, it is crucial to control the downward pressure ("downforce") exerted on the soil. Excessive downforce can compact the soil, impairing root development, while insufficient pressure can cause shallow sowing, exposing the seeds to environmental conditions and reducing germination rates.

For all these reasons, the system must allow for the application of force in both directions, taking into account situations where the self-weight of the sowing unit is not sufficient to generate the furrow at the appropriate depth, and the opposite extreme, in which this self-weight is excessive for given soil hardness conditions.

Traditional downforce control systems use passive methods, such as mechanical springs, which apply a fixed pressure, with no dynamic adjustment capability.

With the development of precision seeding, active systems have emerged that use sensors to dynamically measure and adjust downforce. These technologies rely on the integration of advanced sensors, electronic controllers, and hydraulic or pneumatic actuators.

Below are some relevant systems that constitute the prior art:

1. Sensors

Sensors are used to measure the force applied by the planting body on the soil. The main technique used is:

Load Cells: They detect forces by means of the deformation of a material subjected to pressure. The deformation usually occurs in sensors called strain gauges, where an associated electrical or electronic circuit generates an electrical signal proportional to the applied force. These sensors are usually installed on the arms of the seeding unit or directly on the contact wheels.

2. Active Downforce Systems

Active systems integrate sensors with electronically controlled actuators to adjust pressure in real time. Prominent examples include:

"DeltaForce" (from Precision Planting): It uses load cells to measure the weight applied to each row of the seedling. An electronic controller processes this data and automatically adjusts the pressure using a hydraulic actuator. This system allows for row-by-row calibration. This is achieved with a pin-type sensor, which is fixed, and the regulation system has a relative movement to the sowing depth regulation system.

"Active Downforce" (from John Deere): It monitors soil conditions and adjusts hydraulic pressure in real time. The system uses pressure sensors to maintain uniform contact between the contact wheels and the ground, receiving the load differently with a sensor located differently than the previous one.

"SureForce" (from Ag Leader/Kinze): It combines sensors and hydraulic actuators to apply precise downforce. This system also stands out for its ability to adjust the downforce individually for each planting unit. With a sensor with a geometry such that it contains a hole where it senses the movement of a part that is in turn attached to the depth control arms.

Parker: This system is very similar to the previous ones and is based on load cells and hydraulic actuators to apply precise downforce based on an electronic control loop. Its sensor does not work by bending, but by compression, having a shape more like a "coin/button" than an axis like other cases. It can operate individually on each seed body.

As part of the Prior Art, paragraphs from U.S. Pat. No. 8,561,472 are transcribed below.

The abstract of U.S. Pat. No. 8,561,472 indicates: "A load-sensing pin arranged to receive a load applied in a direction substantially transverse to a longitudinal axis of the pin. A sensor is substantially fixedly oriented with respect to the applied load or alternatively with respect to the pin that is rotationally restrained with respect to a support structure. The sensor is arranged to generate a load signal corresponding to the pin tension resulting from the applied load."

It can be seen that, already in the summary of the invention, they advance that their sensor has restricted angular displacement (rotation) of the sensor.

U.S. Pat. No. 8,561,472 at Column No. 8, row 20 to 40 further provides that: "Additionally, the strain gauge will vary depending on the direction and location of the load relative to that surface. For the preferred load-sensing pin, the "beam" is generally circular in cross-section. Therefore, if an extensometer were applied to the curved outer surface of the load-sensing pin, then variation in the radial location of the extensometer would contribute to the inaccuracy of the measured strain and, therefore, to the load acting on the load-sensing pin. For example, if the load-sensing pin were allowed to rotate freely about its longitudinal axis and the extensometer were at the front or rear of the pin (along the neutral axis relative to the load L2), then the measured strain (and consequently the stress) would be close to zero. Accordingly, in the preferred embodiment, the system comprises a 4-point pin assembly comprising the 4-point pin and a restraint. In the preferred embodiment, a flat surface is provided on the 4-point pin directly opposite the application of load L2 and this orientation is preferably maintained by the restraint restricting the ability of the 4-point pin to rotate about its longitudinal axis. As a result, the bending stress (Fb) will be substantially constant along the surface and therefore accurate measurements do not depend as much on highly precise placement of the strain gauge."

You can see that they explain that they fix the angular position so that the sensor is not "free" and can thus rotate on its own (for example, by vibrations).

Current systems fix the sensor to the seeding body chassis, in a single position in which this measurement is optimal, being aware that in the rest of the seeding depth regulation travel the precision inevitably decreases, because the force that it must measure is broken down into a perpendicular vector (which it can detect) and a parallel vector (which it cannot detect).

In fact, all systems currently have the sensor attached to the seeding body, while the rest of the seeding depth adjustment mechanism rotates relative to the sensor. With this configuration, the load transfer from the leveling wheel arms to the sensor is decomposed into two vector components, one parallel to the sensor and one perpendicular to the sensor. The angle of rotation of the seeding depth adjustment mechanism, to obtain different seeding depths, is related to the angle at which the load force impacts the sensor.

That is to say, except in a precise and specific location of the sowing depth regulation mechanism, in the rest of the possible positions of said sowing depth regulation mechanism the sensor receives a force that can be broken down into a perpendicular vector component and a parallel vector component.

For this reason, as the position of the depth adjustment mechanism changes, the angle at which the loading force impacts the sensor changes, consequently the parallel vector component of the received force increases while the perpendicular vector component decreases, which can ultimately determine an inaccurate and imprecise measurement of the force to be measured.

BRIEF SUMMARY OF THE INVENTION

The present invention relates to a SENSOR ASSOCIATED TO A DEPTH REGULATION DEVICE, APPLICABLE TO A SOWING BODY, characterized in that said sensor is mechanically coupled to the aforementioned depth regulation device and comprises at least one load application point arranged on its upper surface and in proximity to the lower section of a transverse shaft which receives and transmits the load applied by a respective pivot connected to the support arms of a respective gauge wheel of the seeding unit. Wherein the sensor is preferably a load sensor suitable for measuring the load transfer from the arms of leveling wheels that make up the sowing body.

The sensor is fixed angularly to the depth regulation mechanism, ensuring its rotation in solidarity with it.

The sensor can be located on the sowing body by means of rolling elements arranged in said sowing body, where said rolling elements serve as support for the sensor and allow it to rotate with respect to the sowing body, rotating in solidarity with the depth regulation system.

The present invention also comprises bushings arranged in the sowing body, which serve as support for the sensor and allow it to rotate with respect to the sowing body, rotating in solidarity with the depth regulation system.

That innovation also comprises a geometric fixing system to angularly fix the sensor to the depth regulation mechanism of the sowing body.

It also comprises a sensor capable of sensing the magnitude of force exerted by the leveling wheels on the ground and electronics mounted on the same sensor that is capable of transforming the deformation of the sensor into an electrical signal.

It also comprises a sensor that has the capacity to sense the magnitude of force exerted by the leveling wheels on the ground, an electronic device mounted externally to the sensor that is capable of transforming the deformation of said sensor into an electrical signal.

It comprises a sensor with one or more support points that can be supported by any type of rolling elements too.

It also comprises a sensor with one or more support points that can be supported by any type of bushing.

It also comprises a sensor with one or more load application points.

It also comprises a sensor connected to an electronic controller by means of at least one cable.

It also comprises a sensor connected to an electronic controller via a wireless connection.

It also has a sensor for each sowing body or it has a sensor per module of sowing bodies, where each module is made up of a determined quantity of sowing bodies different from one.

Finally, the sensor is integrated by at least one strain gauge.

BRIEF DESCRIPTION OF THE DRAWINGS

In order to specify the advantages thus briefly commented, to which users and experts in the specialty may add many more, and to facilitate the understanding of the constructive, constitutive and functional characteristics of the invented device, a preferred embodiment example is described below, which is illustrated, schematically and without a specific scale, in the attached sheets, with the express clarification that, precisely because it is an example, it is not appropriate to assign to it a limiting or exclusive character of the scope of protection of the present invention, but simply has a merely explanatory and illustrative intention of the basic conception on which it is based.

FIG. 4 (PRIOR ART) is a diagram that indicates a force transfer situation with decreased resolution proportionally to the horizontal component FT as occurs in the sensors of current systems.

FIG. 6 is a sectional view showing where the sensor is mounted in an arrangement contemplated by the present invention.

FIG. 7 is also a sectional view showing another mounting option for the sensor of this invention.

It is clarified that, in all figures, the same reference numbers and letters correspond to the same or equivalent parts or constituent elements of the set, according to the example chosen for the present explanation of the invented regulating device.

DETAILED DESCRIPTION

Each agricultural seeding machine has an average of 20 seeding bodies, designed to produce 20 furrows in which seeds are deposited and then covered.

Each of the seeding bodies of an agricultural seeding machine has its own depth adjustment mechanism, which determines the depth at which the soil is tilled to create each furrow into which the seeds are deposited.

Figure 1:
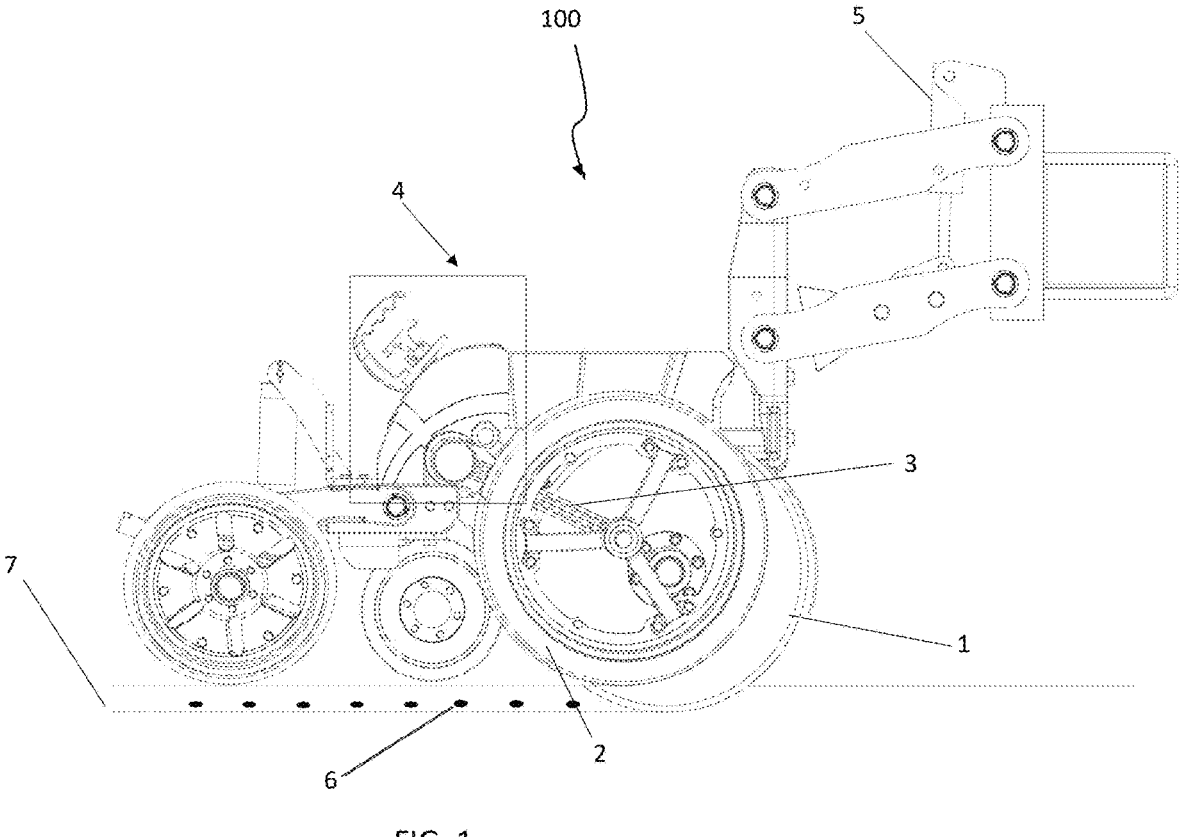
FIG. 1 is a side view schematically showing a seeding body including the device for measuring the applied force of the present invention.

The present invention relates to a device that can be applied to seed bodies. In the average case mentioned above, an agricultural seeding machine will have twenty seeding units, each equipped with its own depth adjustment device. All or some of the units may be equipped with a built-in sensor. As shown in FIG. 1, the depth regulation device with built-in sensor, applicable to sowing bodies of an agricultural seeding machine to which this invention refers, has been designed to be applied on a sowing body (100) in charge of generating a furrow for the seeds (6) to be deposited by means of a dispenser, not shown in the figure, at a predefined and constant sowing depth (7) throughout a work cycle and, finally, to cover said furrow.

As is known, the cutting discs (1) penetrate the soil, creating a "V" shaped furrow. Once the desired planting depth is reached, the wheels (2) make contact with the ground and prevent the discs from penetrating further. These leveling wheels exert a force on the ground that must be controlled within certain parameters. If this force is excessive, high compaction is generated in the soil surrounding the furrow, which prevents optimal seed germination. On the other hand, too little force can leave the surface surrounding the furrow prone to collapse and leave air spaces within it, a condition that also hinders crop growth.

It is for these reasons that the value of force exerted by the wheels (2) on the ground must be known and maintained within a safe range, thus ensuring homogeneous growth of the crops. The hydraulic or pneumatic cylinder (5) is responsible for exerting the force to obtain correct penetration of the cutting discs (1) and the optimal force margin on the wheels (2).

The same FIG. 1 shows that the wheels (2) are connected to the sowing body (100) by means of the arms (3). The depth regulation mechanism (4) of the sowing body, responsible for limiting the sowing depth (7), is responsible for putting a stop to the arms (3) to stop their upward movement.

Figure 2:
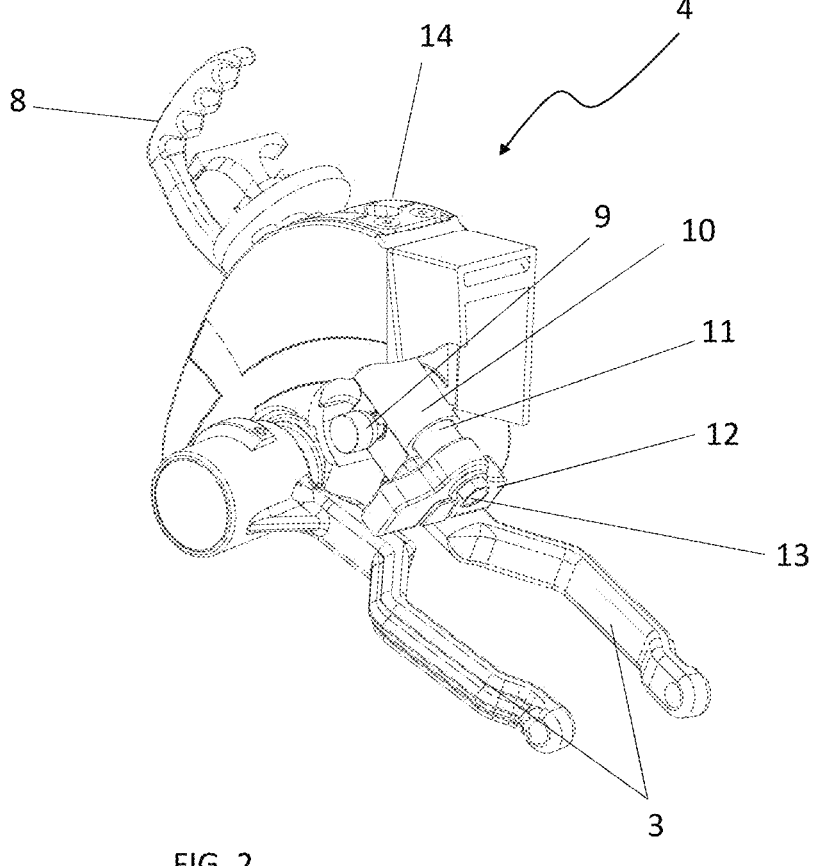
FIG. 2 is a perspective view showing, in a preferred embodiment, the regulation device of this invention with the built-in sensor.

Looking now at FIG. 2, we can see the depth regulation device (4) of the sowing body, responsible for limiting the penetration depth of the sowing body into the ground and measuring the load exerted by the wheels (2). It can be seen that the load is transmitted by the arms (3) to a pivot (12), which is fixed, by means of a screw (13), to an axis (11) that is internal to a support (10). This support (10) has a conduit that is crossed by the sensor (9).

Thus constituted the depth regulation mechanism (4), when the regulation crank (8) is actuated to set a sowing depth, it engages one of the slots of the fixing plate (14), thus limiting the rotation of the entire assembly.

Once the discs (1) that make up the respective sowing body (100) penetrate the soil to the desired depth, the arms (3), which are bolted to the wheels (2), stop against the pivot (12). The more force the hydraulic or pneumatic cylinder (5) continues to exert, the greater the load that the wheels (2) apply against the ground and the greater the compaction of the ground. The sensor (9) has the ability to measure this force exerted by the wheels (2) on the ground and then send a signal that can be of the electronic type by means of a cable to a controller (not shown in the figure) or that could even be wireless (not shown in the figure). Said controller analyses this signal and depending on the value of the force exerted by the wheels (2) on the ground, it will send a signal to the actuator valve (5) to increase or decrease the force applied to the sowing body (100).

The force applied by the arms (3) is transmitted to the sensor (9). Depending on the angular position of the depth adjustment system with respect to the sensor (9), this force will be transmitted in a certain direction.

Figures 3, 5:
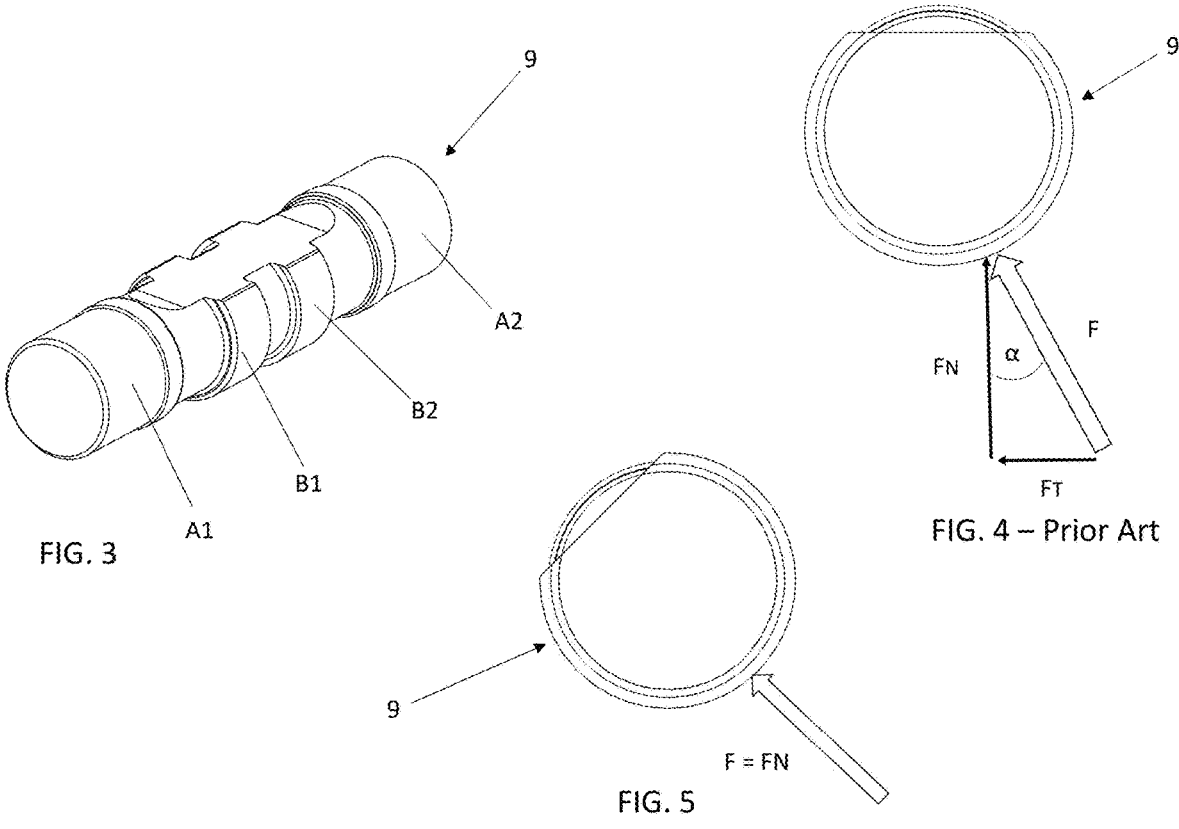
FIG. 3 is a perspective view showing a sensor suitable for incorporation into the device of this invention.
FIG. 5 is a diagram showing how the sensor would work in the special arrangement in which it is found in the present invention, in a load transfer situation similar to that of FIG. 4.

FIG. 3 shows, in a preferred embodiment, the sensor (9), including one or more support points, here called A1 and A2 and one or more load application points, here called for example B1 and B2, which is capable of measuring the force exerted by the wheels (2) through the arms (3) by means of an elastic deformation.

As with all sensors on the market, the housing for the electronics or strain gauge that measures the deformation is located on the top of the bolt.

FIG. 4 (PREVIOUS ART) exemplifies a case of a sensor (9) like that of some of the current systems, which are fixed angularly to the sowing body (100), measuring a compound force, without being able to measure only one "FN" force efficiently. The greater the angle of inclination "a" of the resulting force, the more aggravated this effect is and the resolution of the sensor (9) decreases.

Likewise, FIG. 5 shows the solution that the present invention proposes for such cases when the sensor (9) is arranged integrally with the support (10), so that when the depth regulation mechanism (4) is placed in another position, the sensor will also rotate integrally with it. In this way, the direction of the force transmitted by the wheels (2) through the arms (3) will always have the optimal direction with respect to the capacity of the sensor (9), that is, it will impact on it perpendicularly.

If we look at FIG. 6, we can verify, as an example, that the sensor (9) is supported on two needle bearings (15), while in FIG. 7, the same sensor (9) is supported by means of bushings (16).

Figure 8:
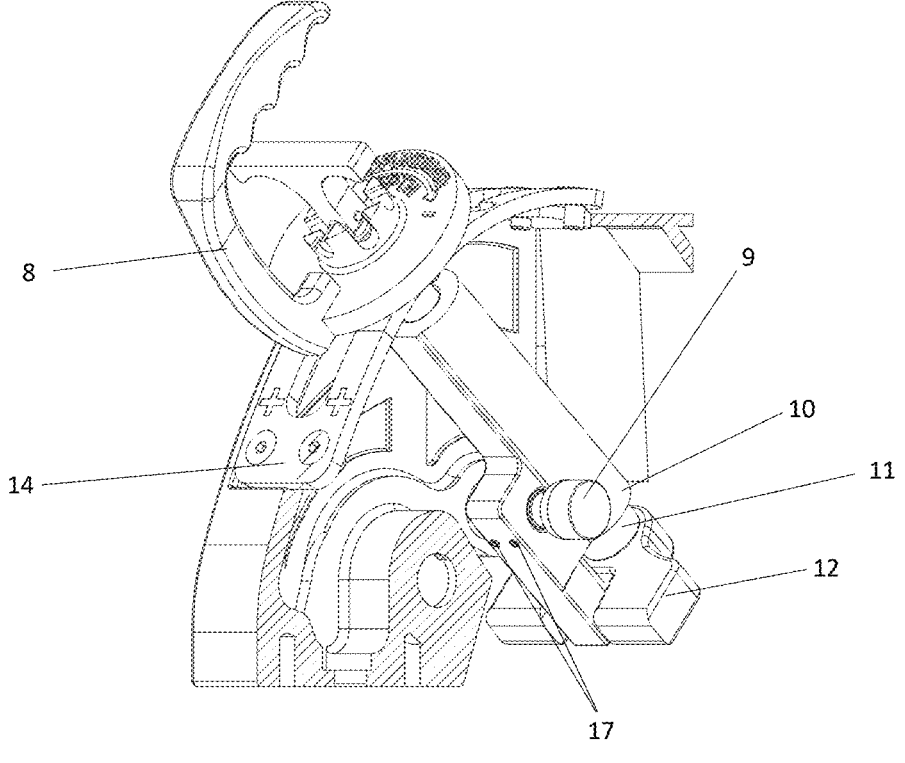
FIG. 8 is a perspective view showing the invented regulating device, exemplifying the fixing of the sensor.

Looking now at FIG. 8, we see that the prisoners (17) are a possible example of angular fixing of the sensor (9) in the depth regulation mechanism (4). However, the invention is not limited to this specific form of fixing but can be any simple form of fixing.

Figure 9:
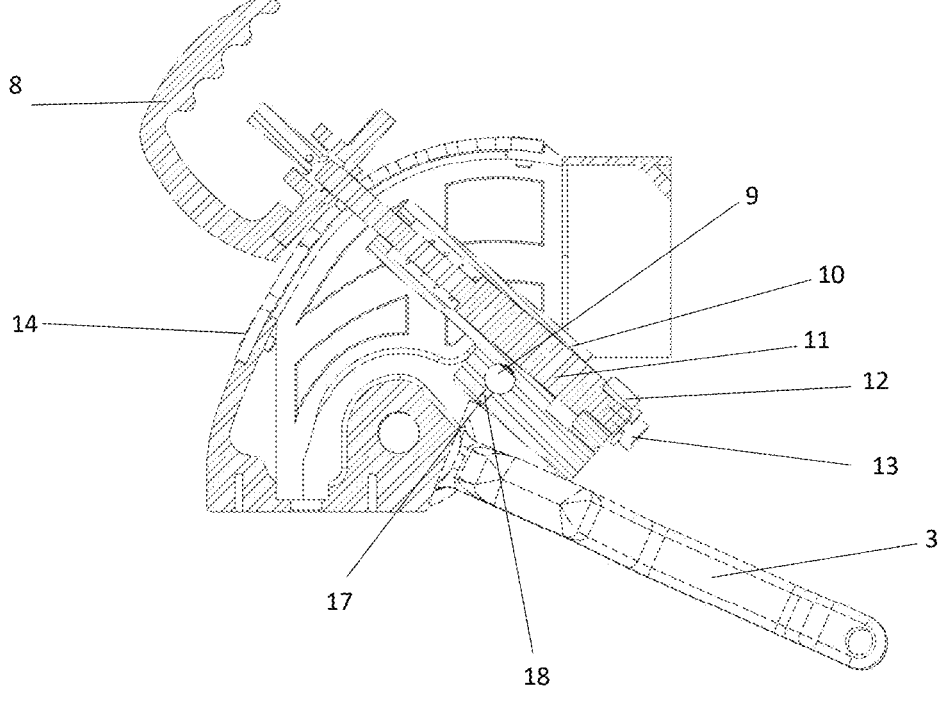
FIG. 9 is a sectional view of the same diagram as the previous figure.

Looking at FIG. 9 you can see another example of fixing in which the same prisoners (17) are shown in contact with bronze inserts (18), which press on the sensor (9).

Figure 10:
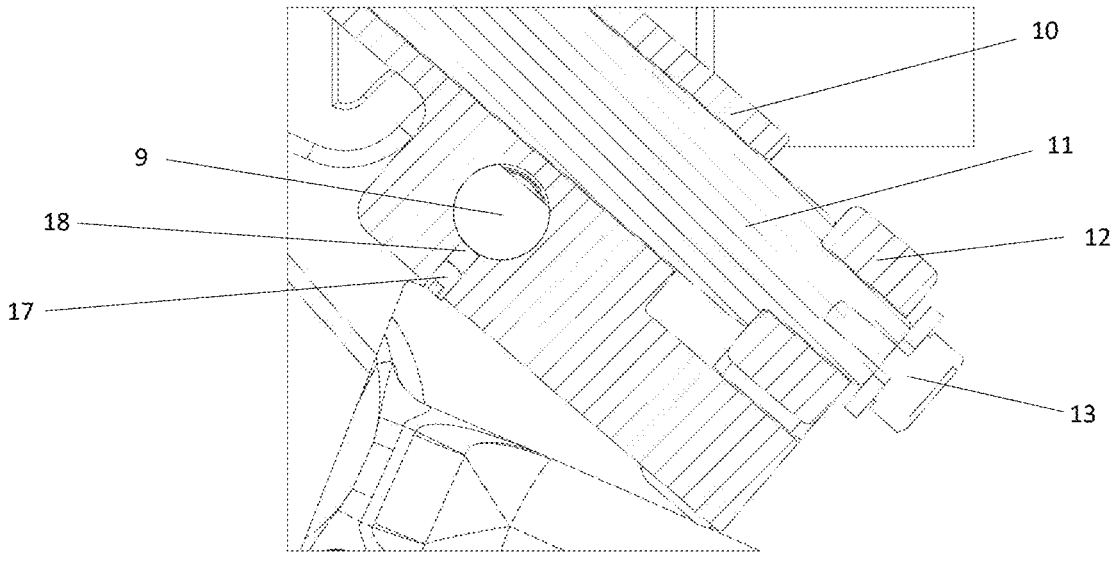
FIG. 10 is an enlarged detail of the assembly shown in the previous figure.

Likewise, FIG. 10 is a detail that allows us to appreciate the arrangement of the same prisoners (17) and (18).

The system that maintains an optimal load application direction at all times with respect to the sensor referred to in this invention. This is thanks to the fact that, due to its special location, the sensor always rotates in conjunction with the rest of the depth adjustment mechanism. This rotation is controlled and does not allow relative movement between the aforementioned depth regulation mechanism and the sensor.

In this way, the resolution of the load transfer measurement from the leveling wheel arms to the sensor is not affected at any time, always being the most direct, simple, and efficient.

This is a sensor that is capable of obtaining an optimal measurement throughout the entire rotation range of the aforementioned sowing depth regulation mechanism, eliminating parallel vector force components since, due to its special arrangement fixed to the depth regulation mechanism of the sowing body, the force received by the aforementioned sensor, coming from the load transfer of the arms of the leveling wheels, is always completely perpendicular, which means that its parallel component is zero.

In the case of the present invention, the difference is that the sensor will rotate, but not "freely", but rather it will have a "controlled" rotation and always in conjunction with the sowing depth regulating mechanism, so that the strain gauge can always remain in the direction perpendicular to the force it must measure.

What is claimed is:

1. A depth regulation device for a seeding machine, comprising:

a sensor pivotally mounted on the seeding machine and attached to a support of the depth regulation device, wherein the sensor and the support rotate coaxially and integrally in conjunction with the depth regulation device throughout the depth regulation device's entire rotation range;

wherein the sensor further comprises at least one load application point arranged on an upper surface and in proximity to a lower section of a transverse shaft, which transmits the load applied by a respective pivot connected to a support arm of a wheel of the seeding machine, thereby maintaining a constant perpendicular direction of the applied load relative to the sensor.

2. The depth regulation device of claim 1, wherein the sensor is a load sensor suitable for measuring a load transfer from the support arm of the wheel.

3. The depth regulation device of claim 1, wherein the support comprises bushings or needle bearings.

4. The depth regulation device of claim 1, comprising a geometric fixing system to angularly fix the sensor to a depth regulation mechanism of the sowing body and ensure the sensor rotate coaxially with the depth regulation device.

5. The depth regulation device of claim 1, wherein the sensor is capable of sensing a magnitude of force exerted by leveling wheels on a surface and the depth regulation device further comprises electronics mounted on the sensor capable of transforming a deformation of the sensor into an electrical signal.

6. The depth regulation device of claim 1, wherein the sensor is capable of sensing a magnitude of force exerted by leveling wheels on a surface and the depth regulation device further comprises an electronic device mounted externally to the sensor capable of transforming the deformation of said sensor into an electrical signal.

7. The depth regulation device of claim 1, wherein the sensor comprises one or more support points for any type of rolling elements.

8. The depth regulation device of claim 1, wherein the sensor comprises one or more support points for any type of bushing.

9. The depth regulation device of claim 1, wherein the sensor comprises one or more load application points.

10. The depth regulation device of claim 1, wherein the sensor is connected to an electronic controller by at least one cable.

11. The depth regulation device of claim 1, wherein the-sensor is connected to an electronic controller via a wireless connection.

12. The depth regulation device of claim 1, comprising one-sensor for each sowing body.

13. The depth regulation device of claim 1, comprising one sensor per module of sowing bodies, where each module is made up of a determined quantity of sowing bodies different from one.

14. The depth regulation device of claim 1, wherein the sensor is integrated by at least one strain gauge.

* * * * *